(12) United States Patent
Schaufl

(10) Patent No.: US 11,302,489 B2
(45) Date of Patent: Apr. 12, 2022

(54) ELECTRODE ASSEMBLY, ENERGY STORAGE DEVICE COMPRISING THE ELECTRODE ASSEMBLY AND A METHOD FOR PRODUCING THE ELECTRODE ASSEMBLY

(71) Applicant: MacroCaps ApS, Copenhagen (DK)

(72) Inventor: Rayk-Peter Schaufl, Borken (DE)

(73) Assignee: MacroCaps ApS, Holte (DK)

( * ) Notice: Subject to any disclaimer, the term of this patent is extended or adjusted under 35 U.S.C. 154(b) by 0 days.

(21) Appl. No.: 16/753,820

(22) PCT Filed: Oct. 8, 2018

(86) PCT No.: PCT/EP2018/077370
§ 371 (c)(1),
(2) Date: Apr. 6, 2020

(87) PCT Pub. No.: WO2019/072781
PCT Pub. Date: Apr. 18, 2019

(65) Prior Publication Data
US 2020/0251291 A1      Aug. 6, 2020

(30) Foreign Application Priority Data
Oct. 10, 2017    (EP) ..................................... 17195822

(51) Int. Cl.
*H01G 11/26*        (2013.01)
*H01G 11/74*        (2013.01)
(Continued)

(52) U.S. Cl.
CPC ............. *H01G 11/26* (2013.01); *H01G 11/74* (2013.01); *H01G 11/84* (2013.01); *H01G 11/52* (2013.01)

(58) Field of Classification Search
CPC ......... H01G 11/26; H01G 11/82; H01G 11/12
See application file for complete search history.

(56) References Cited

U.S. PATENT DOCUMENTS

| 4,307,161 A | 12/1981 | Brown |
| 5,300,373 A | 4/1994 | Shackle |

(Continued)

FOREIGN PATENT DOCUMENTS

| CN | 103165899 A | 6/2013 |
| CN | 104638213 A | 5/2015 |

(Continued)

OTHER PUBLICATIONS

International Preliminary Report on Patentability, dated Jan. 2020.
(Continued)

*Primary Examiner* — Eric W Thomas
(74) *Attorney, Agent, or Firm* — Cahn & Samuels, LLP

(57) ABSTRACT

An electrode assembly includes a fan-folded multilayer containing a separator as an inner layer, current collectors as outer layers, and electrode material between the two sides of the separator and the current collectors, and a first terminal that is attached to the upward folds of the fan-folded multilayer and a second terminal that is attached to the downward folds of the fan-folded multilayer. An energy storage device includes the electrode assembly.

18 Claims, 3 Drawing Sheets

(51) Int. Cl.
*H01G 11/84* (2013.01)
*H01G 11/52* (2013.01)

(56) References Cited

U.S. PATENT DOCUMENTS

| | | | |
|---|---|---|---|
| 5,478,668 A | 12/1995 | Godz et al. | |
| 6,287,721 B1 * | 9/2001 | Xie | H01M 10/04 429/152 |
| 7,102,877 B2 * | 9/2006 | Mitchell | H01M 4/8817 361/502 |
| 2002/0160263 A1 | 10/2002 | Corrigan et al. | |
| 2003/0031925 A1 | 2/2003 | During | |
| 2005/0019652 A1 | 1/2005 | Fauteux et al. | |
| 2008/0241656 A1 * | 10/2008 | Miller | H01G 11/22 429/122 |

FOREIGN PATENT DOCUMENTS

| | | |
|---|---|---|
| DE | 2613390 A1 | 2/1978 |
| EP | 0659299 B1 | 8/1996 |
| FR | 1151510 A | 1/1958 |
| JP | 2000353643 A | 12/2000 |
| JP | 2001338848 A | 12/2001 |
| JP | 3423852 B2 | 7/2003 |
| JP | 2004153259 A | 5/2004 |
| JP | 5098859 B2 | 12/2012 |
| WO | 9407276 A1 | 3/1994 |

OTHER PUBLICATIONS

Written Opinion of the International Preliminary Examining Authority, dated Sep. 2019.
English Abstract for JP5098859 B2. Dec. 12, 2012.
English Abstract for DE2613390 A1. Feb. 16, 1978.
English Abstract for EP0659299 A1. Jun. 28, 1995.
Machine translation of Specification of FR1151510 A via Espacenet on Apr. 23, 2020.
English Abstract for JP2000353643A. Dec. 19, 2000.
English Abstract for JP2001338848 A. Dec. 7, 2001.
English Abstract for JP2004153259 A. May 27, 2004.
English Abstract for JP3423852 B2. Jul. 7, 2003.
English Abstract for CN103165899 A, Jun. 19, 2013.
English Abstract for CN104638213 A, May 20, 2015.

* cited by examiner

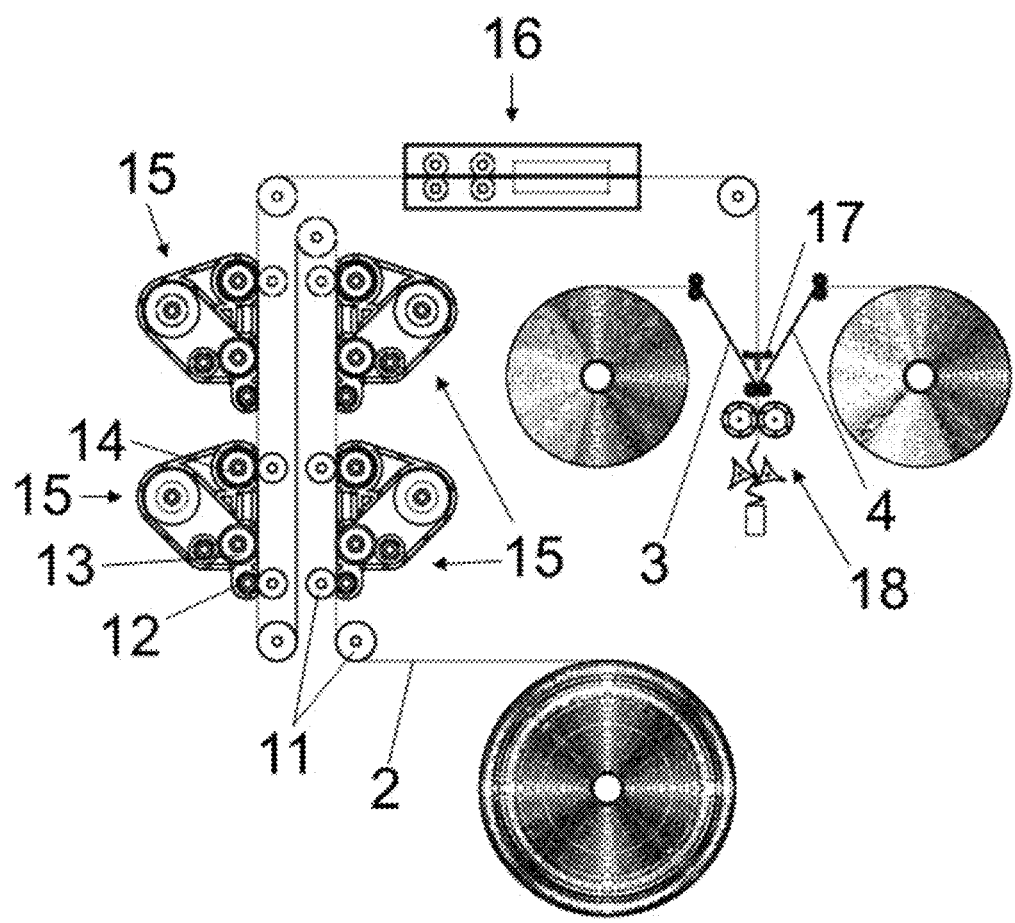

ELECTRODE ASSEMBLY, ENERGY STORAGE DEVICE COMPRISING THE ELECTRODE ASSEMBLY AND A METHOD FOR PRODUCING THE ELECTRODE ASSEMBLY

This U.S. patent application is a national stage application of PCT/EP2018/077370 filed on 8 Oct. 2018 and claims priority of European patent document 17195822.6 filed on 10 Oct. 2017, the entireties of which are incorporated herein by reference.

The present invention relates to an electrode assembly, an energy storage device comprising the electrode assembly and a method for producing the electrode assembly.

BACKGROUND AND SUMMARY OF INVENTION

Electrode assemblies are components of energy storage devices such as batteries, secondary batteries and capacitors. In the state of art, there are usually two types of electrode assemblies that are used in said energy storage devices. There are spiral-wound electrode assemblies, wherein two continuous electrodes laid on top of the other are wound into a cylindrical configuration. On the other hand, there are stacked, multi-plate electrode assemblies, wherein the individual electrode plates are stacked parallel to each other. Recently, stacked electrode assemblies have been developed, wherein continuous lengths of material are used to form parallel stacked electrode assemblies. The advantage of using continuous lengths of material is that the number of individual components and the number of mechanical connections required between the electrodes is reduced and thus, the assembly process is simplified.

A disadvantage of these stacked electrode assemblies using continuous lengths of material according to the state of art is that there is a large distance from the electrodes or at least from some of the electrodes or at least from some points of the electrodes to the terminal or to the point of the terminal that is connected to the conducting surfaces of the energy storage device comprising the electrode assembly. Thus, the electrode assemblies have a large internal resistance. The production process of these electrode assemblies according to the state of art is furthermore quite complex. It is often necessary to remove already applied electrode material during the further process or to incorporate non-conductive portions in the current collectors, for example.

It is an object of the present invention therefore to provide an electrode assembly having a short distance from any point of the electrodes to the outer surface of the respective terminal and having a defined and short distance between the two opposing electrodes.

It has been found that the above-mentioned disadvantages can be dealt with when an electrode assembly is provided comprising a fan-folded multilayer containing a separator as an inner layer, current collectors as outer layers, and electrode material between the two sides of the separator and the current collectors, and a first terminal that is attached to the upward folds of the fan-folded multilayer and a second terminal that is attached to the downward folds of the fan-folded multilayer.

The fan-folded multilayer comprises a separator as an inner layer, whose two sides are at least partially covered with electrode material, and current collectors as outer layers, which cover both sides of the at least partially covered separator. The multilayer thus provides a five-layer structure of current collector/electrode material/separator/electrode material/current collector. At portions, where the separator is not covered with electrode material, the multilayer comprises a three-layer structure of current collector/separator/current collector only. Preferably, all sections having a five-layer structure are of equal length. Preferably, all sections having a three-layer structure are of equal length. In a preferred embodiment, each three-layer section is directly arranged between two five-layer sections.

The fan-folded multilayer is a multilayer having a fan-fold (i.e. according fold or zigzag) configuration. The fan-folded multilayer comprises a plurality of segments, which are each separated by a fold. In a compressed state, these segments are stacked parallel to each other. It is preferred that the multilayer is precisely folded that the segments between the folds all have the same length so that all upward folds are on one level and all downward folds are on one level.

The separator separates two opposite electrodes to prevent a short circuit. Furthermore, the separator provides the basis for the electrode material that is coated thereon. The separator is preferably as thin as possible, needs to be ion-permeable and should be chemically inert to the further components. Paper material, polymer material, woven glass fibers, woven ceramic fibers as well as non-woven materials can be used as a separator, for example. Preferably, a continuous length of these materials is used as a separator. The separator according to the present invention preferably have a thickness in the range of 5-50 µm, more preferably 10-40 µm, in particular 15-30 µm.

Preferably, the separator is soaked with an electrolytic liquid, which is a conductive solvent containing positive and negative ions. The electrolytic liquid provides the electrically conductive connection between the two opposite electrodes that are separated by the separator. Preferably, the electrolyte liquid is chemically inert to the further components, provides a low viscosity and a high self-decomposition voltage.

The electrode material between the separator and the current collectors form the electrodes. The electrode material may be of any material or a mixture of materials, which is conductive and has large surface area. Preferably, the electrode material comprises porous carbon, graphene, carbon nanotubes, oxides of transition metals including ruthenium, iridium, iron and manganese, lithium-metal oxides, sulfides including titanium sulfide, or a mixture thereof, more preferably the electrode material comprises porous carbon, graphene, carbon nanotubes or a mixture thereof. Even more preferably, the electrode material consists of porous carbon, graphene, carbon nanotubes or a mixture thereof. The electrode material can furthermore comprise a binding agent. The binding agent is preferably present in an amount of less than 20% per weight, preferably less than 10% per weight, more preferably less than 5% per weight of the electrode material. The binding agent is preferably a thermoplastic polymer, for example polyvinylidene fluoride. In one embodiment, all electrodes have the same composition. In a further embodiment the electrodes have a different composition. The electrodes according to the present invention preferably have a thickness in the range of 1-100 µm, preferably 5-50 µm, more preferably 10-40 µm, in particular 15-30 µm.

Current collectors forming the outer layers of the fan-folded multilayer cover the two sides of the separator containing the electrode material. A current collector is a conductive layer, preferably a metallic conductive layer, more preferably an aluminum layer. Preferably, a continuous length of these layers is used as a current collector. The two current collectors connect the electrodes to the terminals and thus provide electrical conduction between electrodes and terminals.

The first terminal covers the upward folds and the second terminal covers the downward folds of the fan-folded multilayer. The electrode assembly of the present invention thus allows the current to directly flow from the electrodes across the thickness of the current collector and the thickness of the terminal to its outer surface.

Preferably, the first terminal and/or second terminal is attached to the folds over the entire length of the folds. Thus, the first terminal is directly attached to the upward folds and the second terminal is directly attached to the downward folds. Preferably, the first terminal is directly attached to each upward fold and the second terminal is directly attached to each downward fold. The connections of the terminals to the folds over the entire length of the folds provide larger contact areas. Thus, the current flow is improved by minimizing the distance from any point of the electrode to the outer surfaces of the terminals. The terminals can be of any conductive material that is known to a person skilled in the art for that purpose.

In a preferred embodiment, the first terminal and/or second terminal have a form of a plate, preferably a rectangular plate. In the plan view and in the bottom view, the fan-folded multilayer in a compressed state forms a rectangular area showing the upward folds and the downward folds so that rectangular plates can completely cover all folds.

Preferably, the two sides of the separator are directly coated with the electrode material. According to the state of art, the current collectors are usually coated with electrode material prior to being assembled. This leads to the disadvantage that electrode assemblies according to the state of art do not provide a uniform distance between the two opposing electrodes separated by a separator and/or that the two opposing electrodes have a large distance to each other. In the assembly according to the present invention, wherein the electrode material is directly coated on the separator, the disadvantages are overcome.

Any method known to a person skilled in the art for coating a separator material with electrode material can be used for coating of the separator. In a preferred embodiment, the electrode material is printed on the separator using a carbon ink, for example. In a more preferred embodiment, the separator is coated by a method for dry coating a separator with electrode material comprising the steps of charging a separator electrostatically, and applying electrode material on the electrostatically charged separator. Preferably, the step of electrostatically charging the separator is carried out by contacting the separator with a charged object, preferably with a charged roller. The charged object comprises at least one charged area and at least one uncharged area. The pattern of charged and uncharged areas is transferred to the separator so that the electrode material is applied to the charged areas of the separator only. The electrode material is preferably applied by a material transfer roller. The separator can be folded at the areas, which are not coated with electrode material, without the necessity of removing already applied electrode material form the separator.

Preferably, the separator is not coated with the electrode material at the folds. This ensures that possible damages of the thin separator resulting from the folding do not lead to a short circuit. However, it is preferred if the separator is entirely coated with the electrode material between two adjacent folds to provide a large electrode surface area.

The fan-folded multilayer preferably further comprises conductive material, preferably conductive material comprising aluminum, between the electrode material and the current collectors. The outer surface of the electrode material, which is in contact with the current collector, is uneven at the microscopic level, in particular if the electrode material comprises carbon nanotubes. To obtain an even surface even at the microscopic level, conductive material can additionally be applied on the electrode material. The conductive material preferably comprises an aluminum powder, more preferably an aluminum powder having different particles sizes. The conductive material can furthermore comprise a binding agent. The binding agent is preferably present in an amount of less than 20% per weight, preferably less than 10% per weight, more preferably less than 5% per weight of the electrode material. The binding agent is preferably a thermoplastic polymer.

The present invention is further directed to an energy storage device comprising an electrode assembly according to the present invention. An energy storage device according to the present invention is any device that can capture energy produced at one time for use at later time, such as batteries, secondary batteries and capacitors.

The energy storage device may further comprise a housing, which can be any housing known to a person skilled in the art for that purpose. Such housings comprise conducting and non-conducting surfaces. In a preferred embodiment, the energy storage device further comprises a housing having conducting and non-conductive surfaces, wherein the outer surfaces of the first and second terminal of the electrode assembly are the conducting surfaces of the housing. Preferably, these conducting surfaces are parts of the outer surface of the housing so that two or more energy storage devices can be stacked, whereby a conducting surface of a first energy storage device is in contact with a conducting surface of a second energy storage device.

According to a preferred embodiment, the energy storage device is a capacitor, preferably an electric double-layer capacitor. An electric double-layer capacitor is a high-capacity capacitor that mainly achieve separation of charge in a Helmholtz double layer at the interface between the surface of the electrodes and the electrolyte liquid.

The present invention is further directed to a method for producing a fan-folded electrode assembly according to the present invention comprising the steps of applying electrode material on the first and on the second side of the separator, applying an electrolytic liquid on the coated separator, joining current collectors with the obtained separator so that the current collectors form the outer layers, folding the obtained multilayer electrode assembly into a fan-fold configuration, and attaching a first terminal to the upward folds and a second terminal to the downward folds. The electrode material is preferably applied by dry coating the electrode material on the two sides of the separator. Preferably, the method of the present invention is carried out in order indicated.

In a preferred embodiment, the step of applying electrode material on the first and on the second side of the separator is periodically interrupted to form segments of electrode material, which are uniformly spaced apart from one another, wherein the segments of electrode material of the first side of the separator are located directly opposite of the segments of electrode material of the second side of the separator. In the plan view, the segments of electrode material of the one side of the separator exactly overlap the segments of electrode material of the other side of the separator before being folded. Similarly, the gaps between the segments of electrode material of the two sides of the separator exactly overlap before being folded in the plan view. Preferably, the multilayer is folded at each gap so that the fan-folded multilayer consists of five layers between the folds and three layers at the folds.

In a preferred embodiment, the method further comprises the step of determining the position of the segments of electrode material and/or of the gaps between the segments before joining the coated separator with the current collectors, and, optionally, adjusting the folding device to ensure that the multilayer electrode assembly is folded at the gaps. After the current collectors cover the two sides of the separator, it is hardly possible to determine the positions of the segments of electrode material and gaps. According to the present invention, these positions are therefore determined before the current collectors are joined with the separator. The positions of the gaps are transmitted to a control device, which is able to adjust the folding device to ensure that the multilayer is folded at the gaps.

Preferably, the method of the present invention comprises the step of compressing the folded multilayer electrode assembly that the segments, which are separated by the folds, are stacked parallel to each other. Hereby, the capacity in relation to the base area of the electrode assembly is enhanced.

Preferably, the method further comprises the step of cutting the obtained fan-folded multilayer electrode assembly. The step of cutting optionally includes the step of counting the folds and cutting the fan-folded multilayer after a predetermined number of folds.

Preferred embodiments of the present invention will be described with reference to the drawings as follows.

BRIEF DESCRIPTION OF THE DRAWINGS

FIG. 3 illustrates a production process for the fan-folded multilayer of an electrode assembly according to the present invention.

DETAILED DESCRIPTION OF THE INVENTION

Figure 1:
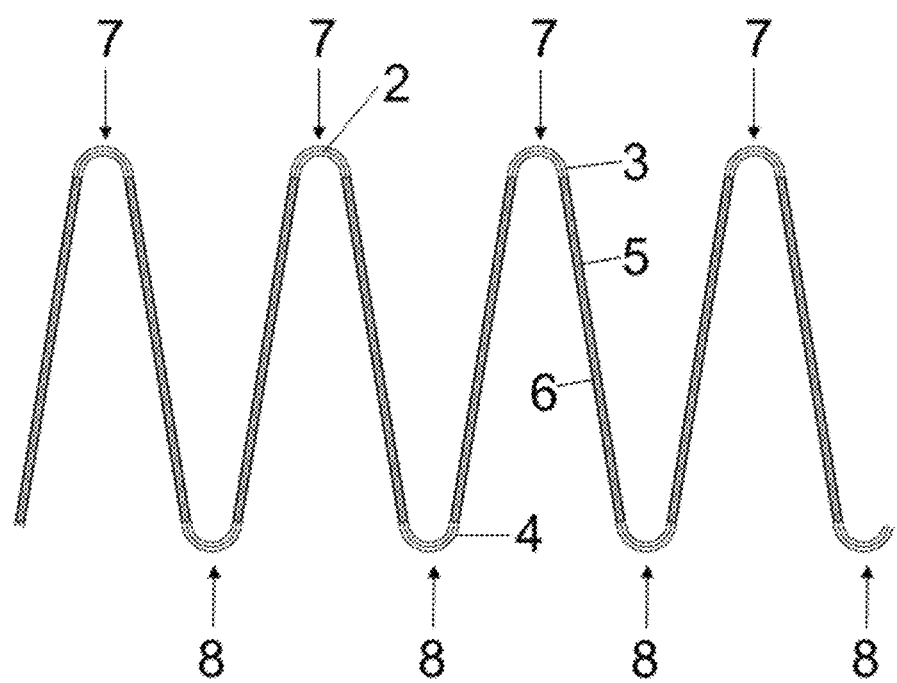
FIG. 1 illustrates a cross-sectional view of a fan-folded multilayer of an electrode assembly according to the present invention.

FIG. 1 illustrates a fan-folded multilayer comprising a separator 2 as an inner layer and current collectors 3, 4 as outer layers. The two sides of the separator 2 are at least partially coated with electrode material 5, 6. More precisely, the separator 2 is coated with electrode material 5, 6 at the segments between two folds 7, 8, whereas the separator 2 is not coated at the folds 7,8. The fan-folded multilayer provides upward folds 7 and downward folds 8.

Figure 2:
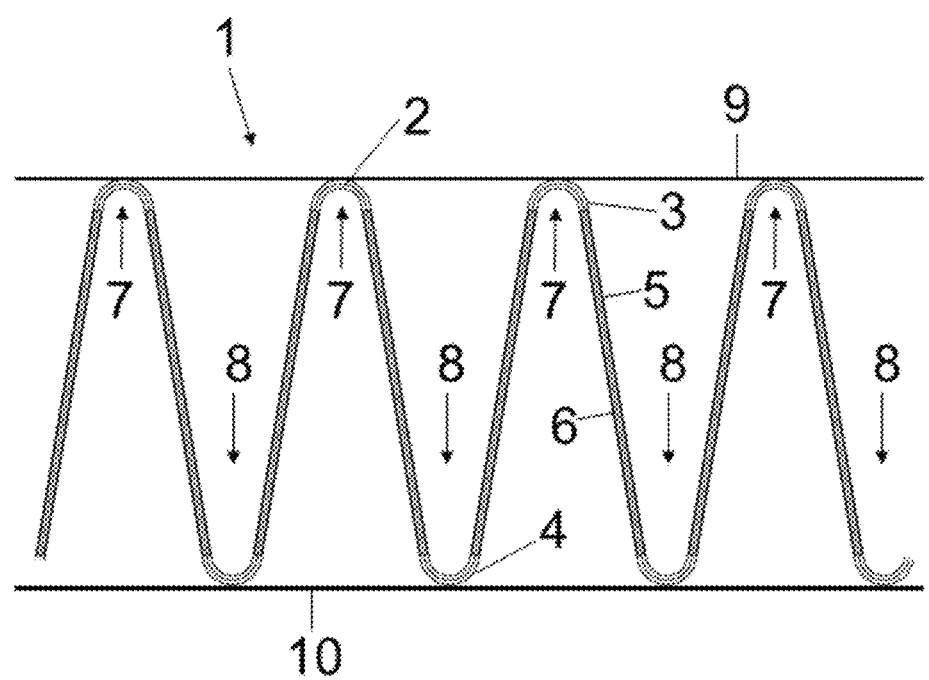
FIG. 2 illustrates a cross-sectional view of an electrode assembly according to the present invention.

FIG. 2 illustrates an electrode assembly 1 according to the present invention comprising the fan-folded multilayer shown in FIG. 1. The electrode assembly further comprises a first terminal 9 and a second terminal 10, which are attached to the upward folds 7 and to the downward folds 8, respectively. In an energy device according to the present invention, the outer surface of the first terminal 9 and the outer surface of the second terminal 10 are the conducting surfaces of the housing.

FIG. 3 illustrates a production process of a fan-folded multilayer as a component of an electrode assembly according to the present invention. The two sides of the separator 2 are coated one after the other first with segments of electrode material 5,6 (not indicated) and then with further conductive material. The coating is carried out by dry coating devices 15 comprising transport means 11, a charging roller 12, a material transfer roller 13 and a heating roller 14. The coated separator 2 is conveyed through a gap determination device 16, wherein the gaps between two segments of electrode material 5, 6 are detected. After electrolytic liquid has been applied on the coated separator by electrolytic liquid nozzles 17, the two current collectors 3, 4 are joined with the separator 2, which current collectors 3, 4 form the outer layer of the multilayer. The obtained multilayer is folded in a folding device 18 to obtain the fan-folded multilayer, wherein the segments between the folds 7, 8 (not indicated) are arranged parallel to each other. Attachment of the first and second terminal 9, 10 (not shown) to the upward and downward folds 7, 8 (not indicated) provide the electrode assembly 1 according to the present invention.

The invention claimed is:

1. Electrode assembly, comprising:
    a fan-folded multilayer containing
        a separator as an inner layer,
        continuous lengths of current collectors as outer layers, and
        electrode material between the two sides of the separator and the current collectors, and
    a first terminal that is directly attached to the upward folds of the fan-folded multilayer, and
    a second terminal that is directly attached to the downward folds of the fan-folded multilayer,
    wherein the first terminal consists of a rectangular plate that completely covers the upwards folds, and
    wherein the second terminal consists of a rectangular plate that completely covers the downward folds.

2. Electrode assembly according to claim 1, wherein the first terminal and/or second terminal is attached to the folds over the entire length of the folds.

3. Electrode assembly according to claim 1, wherein the two sides of the separator are directly coated with the electrode material.

4. Electrode assembly according to claim 1, wherein the separator is not coated with the electrode material at the folds.

5. Electrode assembly according to claim 1, wherein the separator is entirely coated with the electrode material between two adjacent folds.

6. Electrode assembly according to claim 1, wherein the fan-folded multilayer further comprises conductive material, between the electrode material and the current collectors.

7. Energy storage device comprising the electrode assembly according to claim 1 comprising a housing having conducting and non-conductive surfaces, wherein the outer surfaces of the first and second terminal of the electrode assembly are the conducting surfaces.

8. Energy storage device according to claim 7, wherein the energy storage device is a capacitor.

9. Energy storage device according to claim 7, wherein the energy storage device is an electric double-layer capacitor.

10. Electrode assembly according to claim 1, wherein the fan-folded multilayer further comprises aluminum between the electrode material and the current collectors.

11. Electrode assembly according to claim 1, wherein the electrode material comprises porous carbon, graphene, carbon nanotubes, or a mixture thereof.

12. Electrode assembly according to claim 1, wherein the electrode material comprises carbon nanotubes.

13. Electrode assembly according to claim 1, wherein the current collectors comprise aluminum.

14. Method for producing a fan-folded electrode assembly comprising:
- applying an electrode material on a first and on a second side of a separator, applying an electrolytic liquid on the coated separator,
- joining continuous lengths of current collectors with the obtained separator so that the current collectors form outer layers,
- folding the obtained multilayer electrode assembly into a fan-fold configuration, and
- directly attaching a first terminal to upward folds and a second terminal to downward folds,
- wherein the first terminal consists of a rectangular plate that completely covers the upwards folds, and
- wherein the second terminal consists of a rectangular plate that completely covers the downward folds.

15. Method according to claim 14, wherein said applying electrode material on the first and on the second side of the separator is periodically interrupted to form segments of electrode material, which are uniformly spaced apart from one another, wherein the segments of electrode material of the first side of the separator are located directly opposite of the segments of electrode material of the second side of the separator.

16. Method according to claim 15 further comprising determining the position of the segments of electrode material and/or of gaps between the segments before joining the coated separator with the current collectors, and, optionally, adjusting the folding device to ensure that the multilayer electrode assembly is folded at the gaps.

17. Method according to claim 15, further comprising compressing the folded multilayer electrode assembly so that the segments, which are separated by the folds, are stacked parallel to each other.

18. Method according to claim 14, further comprising cutting the obtained folded multilayer electrode assembly.

\* \* \* \* \*